United States Patent [19]

Sugitani et al.

[11] Patent Number: 4,760,241
[45] Date of Patent: Jul. 26, 1988

[54] METHOD OF HIGH-SPEED ROTATION ARC AUTOMATIC FILLET WELDING

[75] Inventors: Yuji Sugitani; Yukio Kobayashi; Masatoshi Murayama, all of Mie, Japan

[73] Assignee: Nippon Kokan Kabushiki Kaisha, Tokyo, Japan

[21] Appl. No.: 855,465

[22] Filed: Apr. 24, 1986

[30] Foreign Application Priority Data

Apr. 26, 1985 [JP] Japan .................................. 60-88732

[51] Int. Cl.$^4$ .............................................. B23K 9/00
[52] U.S. Cl. ............................. 219/137 R; 219/125.12
[58] Field of Search .............. 219/125.12, 136, 137 R, 219/125.11

[56] References Cited

U.S. PATENT DOCUMENTS 4,074,105  2/1978  Minehisa et al. ........... 219/125.12 X
4,419,563  12/1983  Nomura et al. ................. 219/137 R

FOREIGN PATENT DOCUMENTS 133871  10/1980  Japan ................................ 219/137.2

OTHER PUBLICATIONS

Koellhoffer, L. *Shielded Metal Arc Welding*. New York: John Wiley & Sons, Inc., 1983, pp. 144–146 and 154–155.

Primary Examiner—E. A. Goldberg
Assistant Examiner—Catherine M. Sigda
Attorney, Agent, or Firm—Fleit, Jacobson, Cohn & Price

[57] ABSTRACT

An automatic fillet welding method for effecting the welding by rotating a welding electrode and thereby rotating an arc at a high speed. By rotating the arc with a predetermined rotation direction, rotation speed and rotation diameter, a weld metal is prevented from running downward thereby forming a bead having uniform leg lengths and an excellent depth of penetration.

1 Claim, 2 Drawing Sheets

METHOD OF HIGH-SPEED ROTATION ARC AUTOMATIC FILLET WELDING

BACKGROUND OF THE INVENTION

The present invention relates to an automatic high-speed rotating arc fillet welding method.

In the past, the fillet welding of an upright plate arranged vertically with respect to a lower plate has been performed by progressing the welding along the joint to be welded in a flat horizontal posture and thereby welding the corner.

This type of flat horizontal fillet welding has basic disadvantages in that under the effect of the gravity, the bead tends to run down toward the lower plate, making it difficult to produce a bead effectively ensuring uniformity of bead leg length. An undercut also tends to be caused in the upright plate. Particularly, there are problems with the formation of small-leg length beads by the high-speed welding and with the formation of long-leg length beads by the large-current low-speed welding.

SUMMARY OF THE INVENTION

The present invention has been made with a view to overcoming the foregoing deficiencies in the prior art and it is the primary object of the invention to provide an automatic high-speed rotating arc fillet welding method capable of preventing the bead in fillet welding from running downward, increasing the welding speed and increasing the range of leg lengths to be made.

The automatic high-speed rotating arc fillet welding method according to the invention is a welding method which performs flat horizontal fillet welding operations by gas shielded arc welding or submerged arc welding in the following manner.

(a) An electrode nozzle is rotated concentrically so that the tip of a wire passing through the nozzle is rotated and an arc is rotated at a high speed.

(b) Where an upright plate is arranged on the right side with respect to the direction of welding, the direction of rotation of the arc is made clockwise as viewed from above the electrode nozzle, whereas when the upright plate is arranged on the left side with respect to the direction of welding, the direction of rotation of the arc is made counterclockwise as viewed from above the electrode nozzle.

(c) The rotation speed of the arc is selected such that the ratio between the upright plate leg length and the lower plate leg length becomes maximum.

(d) The rotation diameter of the arc is selected between 1 mm and 6 mm.

(e) The diameter of the rotating wire is selected between 0.8 mm and 1.6 mm.

In accordance with the invention, the fillet welding is effected by using a high-speed rotating arc whose direction of rotation, rotation speed and rotation diameter have been predetermined. The fillet welding is performed satisfactorily preventing the bead from running downward, and ensuring the proper depth of penetration.

In accordance with the invention, by virtue of the fact that the fillet welding is effected by using a high-speed rotating arc whose direction of rotation, rotation speed and rotation diameter have been predetermined, the automatic fillet welding is performed in a manner that the running down of a weld metal is prevented, a bead of a desired long leg length is produced easily on the upright plate and the proper depth of penetration is ensured.

There is another advantage in that since an undercut does not easily occur in the upright plate, it is possible to increase the welding speed of the fillet welding and reduce or increase the leg lengths suitably.

The above and other objects as well as advantageous features of the invention will become more clear from the following description taken in conjunction with the drawings.

DESCRIPTION OF THE PREFERRED EMBODIMENTS

In accordance with an automatic high-speed rotating arc fillet welding method according to this invention, the arc is a high-speed rotating arc. In the case of conventional fillet welding using a nonrotating arc, the bead runs down toward the lower plate under the effect of the gravity. This is prevented by applying a force to the bead so that the bead is deflected toward the upright plate and the leg lengths of the bead are made uniform.

In order to examine the running down of the bead, an experiment was made. Two upright plates 2, 2a were provided at both right and left ends of the lower plate 1 and fillet welding was performed at each of the corners thus formed. The beads were produced by narrow groove welding with a rotating arc with a welding current I = 300 A and a welding speed V = 22 cm/min. The results of the experiment are shown in FIG. 1.

Figure 1:
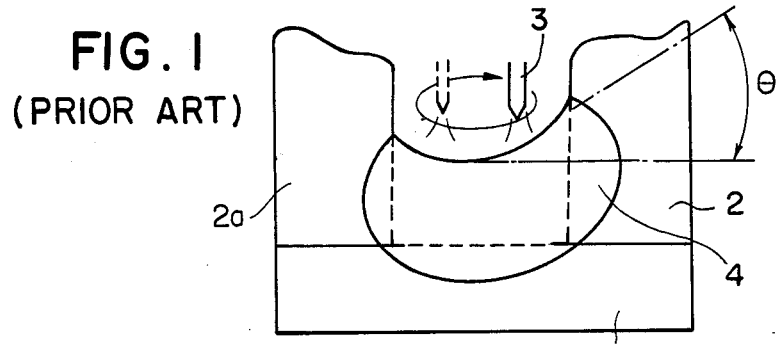
FIG. 1 is an end view of two parallel, vertically extending plates welded to a horizontal plate and showing the deviation of a bead in the Prior Art.

In FIG. 1, the welding progresses into the drawing paper and the direction of rotation of wire 3, as seen from the top thereof, is clockwise. The reference numeral 4 indicates the bead produced. When the external surface of the bead is sectioned by a plane perpendicular to the direction of welding progression, the bead surface forms a concave curve as can be seen in FIG. 1.

The deviation is represented by an angle $\theta$ between the horizontal line shown and a tangent line at an intersecting point on the curve formed by the bead surface.

As may be clearly seen from FIG. 1, the deviation of the bead produced at the side of right upright plate 2 is larger than that produced at the side of the left upright plate. Accordingly, the surface of the bead on the right has a higher deviation than the surface on the left when the welding progresses into the drawing paper and the electrode wire 3 rotates clockwise. The molten metal runs downwardly along the right upright plate 2 less than it does along the left upright plate 2a. Conversely, if the rotation of electrode wire 3 as seen from the top is counterclockwise, the degree to which the molten metal runs downwardly is smaller along the left upright plate 2a than along the right upright plate 2. Accordingly, when the electrode wire 3 rotates counterclockwise, the leg length of the bead produded at the left upright plate 2a becomes longer than that produced at the right upright plate 2.

Figure 2:
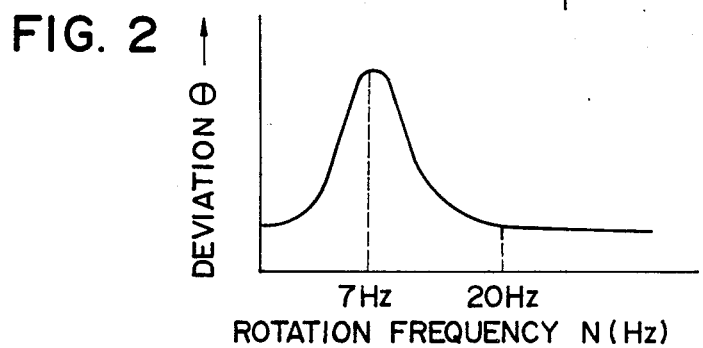
FIG. 2 is a characteristic diagram showing the relation between a rotation frequency and a deviation.

The deviation $\theta$ of the bead 4 is related to the rotation frequency N(Hz) of the arc as shown in FIG. 2, in which the abscissa represents the rotation frequency N(Hz) and the ordinate represents the deviation $\theta$. Thus, under the conditions wherein the welding current I=300 A and the welding speed V=22 cm/min, the deviation $\theta$ is maximized when the arc rotation frequency N is 7 Hz (420 rpm).

The hollow in the molten pool caused by pressure of the arc is rotated according to the rotation of the arc, and the molten pool itself is given a "rotation resonance" by the rotation of the arc. This rotation resonance has its own frequency corresponding to the depth and area of the molten pool. When this particular frequency of the molten pool comes into agreement with the ratation speed, the deviation $\theta$ of the bead on the upright plate becomes a maximum.

Figure 3:
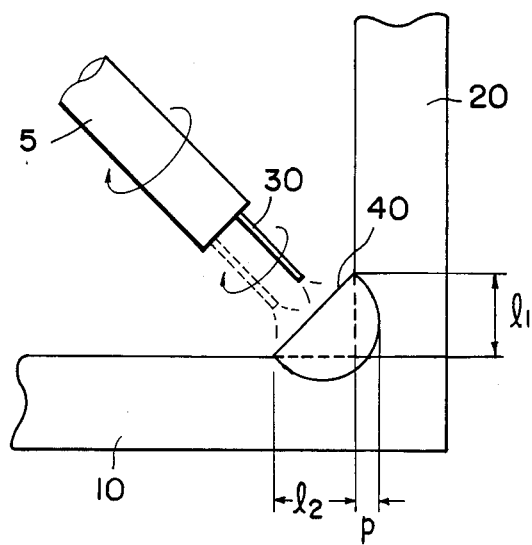
FIG. 3 is an end view of an embodiment of the invention.

Thus, by welding the corner of the lower plate 10 and the upright plate 20 by rotating arc welding, that is, by rotating an electrode nozzle 5 in the flat horizontal fillet welding shown in FIG. 3, it is possible to prevent the molten metal from running downward and to readily produce a desired long leg length bead at the rotation frequency N corresponding to the maximum deviation $\theta$ of the bead 40 and it is possible to improve the shape of the fillet welded bead. It should be apparent from FIG. 3 that when electrode nozzle 5 is rotated concentrically, wire 3, and therefore the arc produced by wire 3, is rotated about a circular diameter. The following Table 1 shows the results obtained by examining the proper rotation frequency No tending to prevent the molten metal from running downward and produce a desired long leg length bead by varying the welding current I and the welding speed V.

TABLE 1

| I(A) | V (cm/min) | V/I | No (Hz) |
|---|---|---|---|
| 300 | 22 | 0.073 | 7 |
| " | 45 | 0.150 | 15 |
| " | 90 | 0.300 | 30 |
| " | 15 | 0.050 | 5 |
| 400 | 22 | 0.055 | 5 |
| " | 45 | 0.112 | 10 |
| 200 | 22 | 0.110 | 10 |
| " | 45 | 0.225 | 20 |

As will be seen from Table 1, the proper rotation frequency No is dependent on the values of the welding current I and the welding speed V and the proper rotation frequency No tends to increase with increase in the ratio V/I. Thus, while the proper rotation frequency No varies with the welding current I and the welding speed V, the proper rotation frequency No can be determined by determining the welding current I and the welding speed V used.

Figure 4:
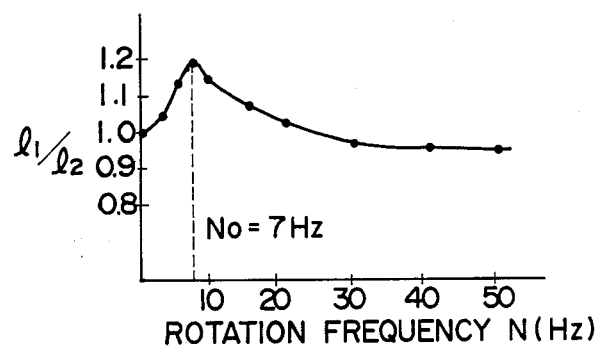
FIG. 4 is a characteristic diagram showing the relation between a rotation frequency and a leg length ratio $l_1/l_2$.

To determine the proper rotation frequency No, it is only necessary to perform the fillet welding with the working welding current I and welding speed V and determine the rotation frequency such that the ratio $l_1/l_2$ between the leg length $L_1$ of the upright plate 20 and the leg length $l_2$ of the lower plate 10 attains a maximum. FIG. 4 shows the relation between the arc rotation frequency and the leg length ratio $l_1/l_2$ when the welding current I is 300 A and the welding speed V is 22 cm/min. Under these welding conditions the proper rotation frequency No becomes 7 Hz (420 rpm) as shown in the Figure.

Figure 5:
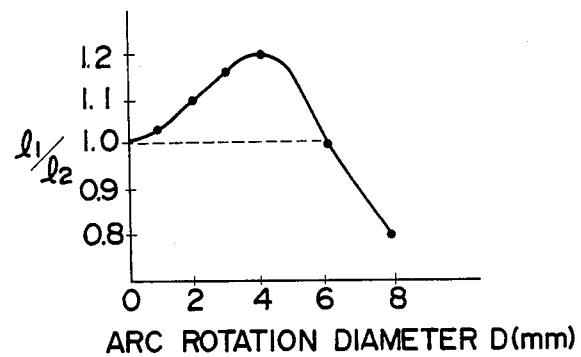
FIG. 5 is a characteristic diagram showing the relation between an arc rotation diameter and a leg length ratio $l_1/l_2$.

On the other hand, even if the welding current I and the welding speed V are constant, the maximum value of the leg length ratio $l_1/l_2$ varies, depending on the rotation diameter D of the arc. For instance, FIG. 5 shows the results of the fillet welding performed by varying the rotation diameter D of the arc under a conditions wherein the welding current I=300 A, the welding speed V=22 cm/min and the rotation frequency=7 Hz. In the Figure, the abscissa represents the rotation diameter D of the arc and the ordinate represents the leg length ratio $l_1/l_2$ with the leg length ratio $l_1/l_2$ obtained without rotating the arc or when D=0 as 1.0. As will be seen from the Figure, with the rotation diameter D in the range between 1 mm and 6 mm, the leg length ratio $l_1/l_2$ becomes greater than 1.0, thus improving the leg lengths.

Figure 6:
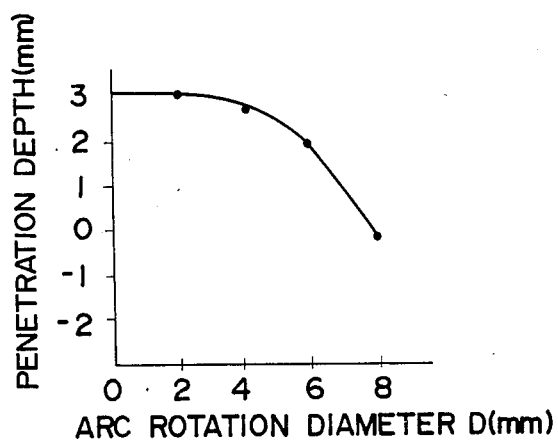
FIG. 6 is a characteristic diagram showing the relation between an arc rotation diameter and a depth of penetration.

Also, not only the leg lengths, but also the propriety of the depth of penetration has a bearing on the propriety of the fillet welding. An examination of the relation between the rotation diameter D and the depth of penetration has shown the results shown in FIG. 6 in which the abscissa represents the rotation diameter D(mm) and the ordinate represents the depth of penetration P(mm). The depth of penetration P is not so small when the rotation diameter D is less than 4 mm and the depth of penetration P becomes zero when the rotation diameter D reaches 8 mm. As a result, the proper depth of penetration can be obtained when the rotation diameter D is in the range between 1 mm and 6 mm.

Thus, when performing fillet welding, the proper rotation frequency No corresponding to the welding current I and the welding speed V is determined first and then the rotation frequency is set to the proper rotation frequency No with the arc rotation diameter between 1 mm and 6 mm thereby automatically preventing the molten metal from running downward and forming a desired long leg length bead.

While, in the above-described embodiment, the fillet welding is effected by MAG welding with a wire diameter of 1.2 mm, the above-mentioned welding method can be used with the wire diameter in the range between 0.8 mm and 1.6 mm. The wire diameters greater than 2.0 mm are excluded for the reason that if the wire diameter exceeds 2.0 mm, the stiffness resistance of the wire increases with the result that a high-power rotating mechanism is required for rotating the wire at high speeds and this is not practical from the cost point of view. Further, the welding is not limited to the MAG welding and the method is also applicable to the $CO_2$ welding, TIG welding and SAW welding.

What is claimed is:

1. An automatic high-speed rotating arc fillet welding method for fillet welding an upright plate to a horizontal plate by gas shielded arc welding or submerged arc welding comprising the steps of:

providing wire having a diameter between 0.8 and 1.6 mm, passing said wire through an electrode nozzle, rotating concentrically the electrode nozzle such that a forward end of said wire passing through said nozzle is rotated in an arc clockwise as viewed from above said electrode nozzle when an upright plate is arranged on a right side of said electrode nozzle with respect to a direction of progress of welding and rotating concentrically the electrode nozzle such that the forward end of the wire passing through said nozzle is rotated in an arc counterclockwise as viewed from above said electrode nozzle when said upright plate is arranged on a left side of said electrode nozzle with respect to said direction of progress of welding, selecting a high rotation speed of said arc such that a ratio between a weld bead leg length along said upright plate and a weld bead leg length along said horizontal plate is maximized at a predetermined welding current and welding speed, providing the arc with a diameter of rotation caused by rotation of said electrode nozzle between 1 mm and 6 mm, and applying said predetermined welding current to said wire to produce a molten pool of material which subsequently solidifies into a weld bead.

* * * * *